US011642648B1

(12) United States Patent
Canuto (10) Patent No.: US 11,642,648 B1
(45) Date of Patent: May 9, 2023

(54) CO2 CAPTURE IN DRY ATMOSPHERIC AIR AND MOLECULAR SIEVES OF CARBON USING MANTLE PERIDOTITE AND SILICA GEL ELECTROLYSIS METHOD

(71) Applicant: Teresita Amponin Canuto, Van Nuys, CA (US)

(72) Inventor: Teresita Amponin Canuto, Van Nuys, CA (US)

( * ) Notice: Subject to any disclaimer, the term of this patent is extended or adjusted under 35 U.S.C. 154(b) by 0 days.

(21) Appl. No.: 17/300,758

(22) Filed: Oct. 27, 2021

(51) Int. Cl.
*B01J 20/02* (2006.01)
*C25B 1/23* (2021.01)
*B01D 53/02* (2006.01)

(52) U.S. Cl.
CPC .......... *B01J 20/0277* (2013.01); *B01D 53/02* (2013.01); *C25B 1/23* (2021.01); *B01D 2257/504* (2013.01)

(58) Field of Classification Search
CPC ........ B01J 20/0277; C25B 1/23; B01D 53/02; B01D 2257/504
USPC ........................................................ 502/427
See application file for complete search history.

(56) References Cited

PUBLICATIONS

Agee et al., "CO2 Snow Deposition in Antarctica to Curtail Anthropogenic Global Warming", Journal of Applied Meteorology and Climatology, vol. 52, Feb. 2013, pp. 281-288. (Year: 2013).*

Hippel, "Thermal Removal of Carbon Dioxide from the Atmosphere: Energy Requirements and Scaling Issues", Embry-Riddle Aeronautical University—Scholarly Commons, Climatic Change, 148(4), 2018. (Year: 2018).*

* cited by examiner

*Primary Examiner* — Anita Nassiri-Motlagh
(74) *Attorney, Agent, or Firm* — Bold IP, PLLC; Houda El-Jarrah (57) ABSTRACT

A collection of systems joined together and formed into a processes to capture CO2 in the dry atmospheric air using an air vacuum pump with attached big fan. The big fan suctions the air while the air vacuum pump pulls the air/gases into the air storage tank. The air/gas being transferred to the built-in freezer in order to freeze it and defrost the ice to liquid. The liquid is drained and transferred to the liquid storage tank. An electrolysis chamber that contains silica gel and peridotite powder allow the separation of molecules upon the application of electrical field. The aqueous silica gel mixed with peridotite powder is the medium serve as an absolute molecular sieves of carbon molecules. A tracking dye is added to the peridotite powder to track the movement of molecules. The liquified gases are injected to the aqueous silica gel. Electrolysis begins by connecting the anode and cathode points to the power supply and electrolysis chamber. When the power supply is switch-on migration of molecules towards the anode and cathode takes place due to electrical field generated by volts. The carbonate ion migrate to the anode side and reacts to the cation (+) of the calcium of the peridotite rocks powder to form calcium carbonate.

6 Claims, 14 Drawing Sheets

CO2 CAPTURE IN DRY ATMOSPHERIC AIR AND MOLECULAR SIEVES OF CARBON USING MANTLE PERIDOTITE AND SILICA GEL ELECTROLYSIS METHOD

BACKGROUND OF INVENTION

The present invention relates to system joined together to form a processes for use in carbon dioxide (CO2) sequestration in dry atmospheric air and molecular sieves of carbon using peridotite rocks powder and silica gel electrolysis method. Temperature rise due to effects of rising greenhouse concentrations. Atmospheric carbon (CO2) affects the global temperature caused the warming of the planet.

In order to solve the problem of the rising greenhouse gas concentration and offset it in the atmosphere, an object of the present invention is to provide a low cost, economical and efficient method of CO2 capture in air. Using an air vacuum pump with attach big fan blades that suction the dry atmospheric air, the air with pure gases on it can be separated by freezing it in the built-in freezer followed by defrosting to liquify the frozen gases. The liquified gases are drained and transferred to a storage tank. The liquified gases are later injected to an aqueous gel made up of silica (natural) gel mixed with peridotite rocks powder and upon the application of electrical field generated by volts of migration of molecules began to occur towards the anode and cathode sides of electrodes. The carbon ions move to anode (positive) and react to cation of Calcium (Cat) of peridotite rocks powder to form calcium carbonate.

SUMMARY OF INVENTION

It is an object of the present invention to offset the rising greenhouse gas concentration in the atmosphere of the planet. Another object of this invention is to provide a low cost, economical and efficient method of COS capture and provide abundant sources of energy such as mineralized carbon after the molecular sieves for carbon molecules sequestration using peridotite rocks molecular sieves in the transparent aqueous silica gel electrolysis method.

Atmospheric air contains oxygen and nitrogen. Air contains pure gases and pure gases can be separated in air by first cooling them until they liquify. Filtering the liquified gases to sequester the carbon molecules is achieved by first, suctioning the dry atmospheric air using an IAR vacuum pump with big fan blades. Second, the suctioned air is stored in an air storage tank. Third, the air/gases is transferred to a built-in freezer to freeze it and subsequently defrosting the ice to liquify it. Fourth, the liquified gases is drained from the freezer, stored in a liquid storage tan. Fifth, a transparent aqueous silica gel is prepared mixed with peridotite rocks powder serves as an absolute molecular sieves of carbon molecules upon the application of electrical field generated by volts during the electrolysis method. Beside peridotite rocks (e.g., Ca-bearing, Mg-rick) or other rocks or minerals available for use as molecular sieves in this invention are the basaltic lava, ultramafic intrusions, or wollastonite but peridotite rocks are the best because it contains olivine, pyroxene, calcium, and magnesium.

The liquifies gases is injected to the transparent aqueous silica gel that sits inside the gel chamber. After the injection of the liquid, gel electrolysis is began by connecting the positive and negative points of electrodes to the power supply and chamber. Upon switch-on of the power supply migration of molecules towards the anode (+) and cathode (−) occurred due to electrical field generated. The carbon molecules move to the anode side and react to the cation of Calcium (Ca) of peridotite rocks powder to for calcium carbonate.

DETAILED DESCRIPTION OF INVENTION

Figure 1:
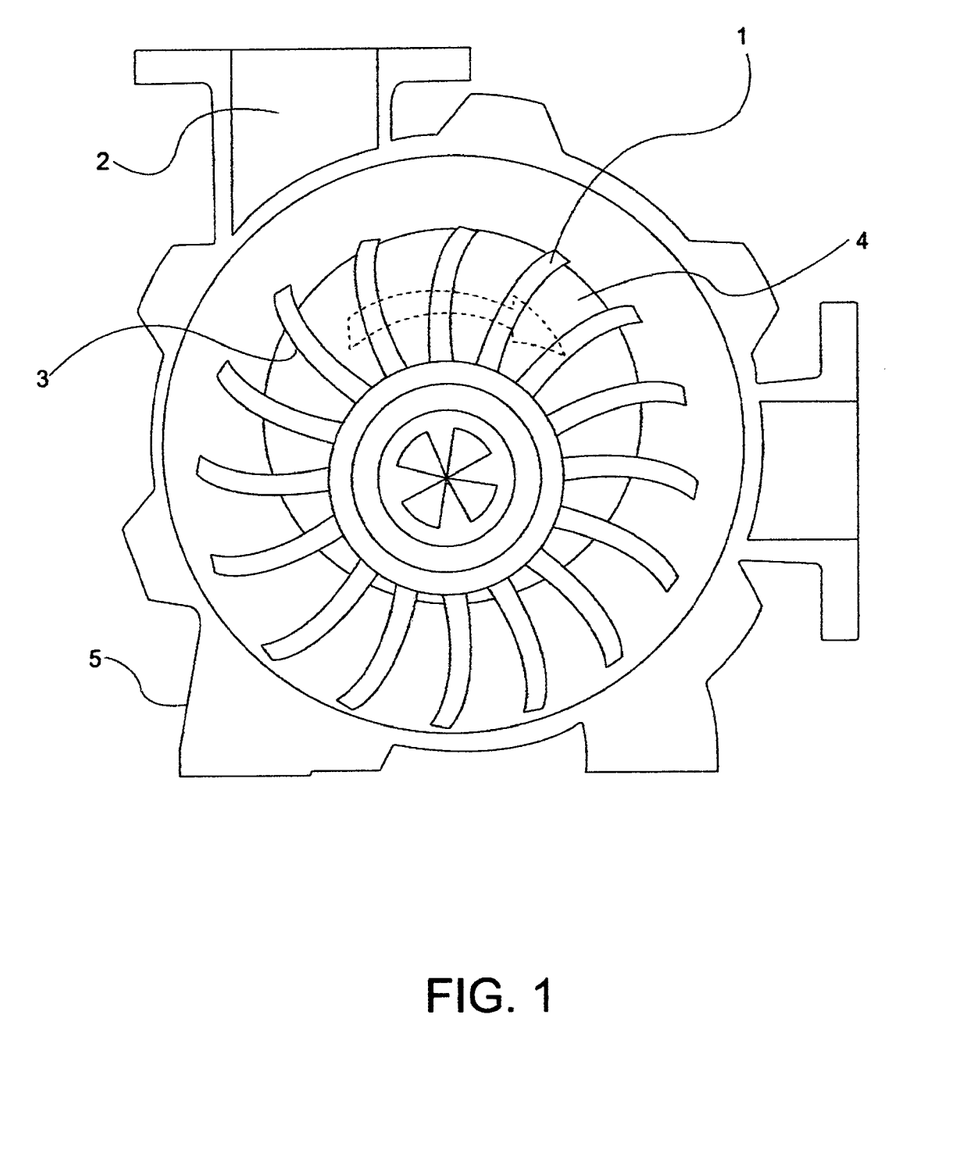
Figure 2:
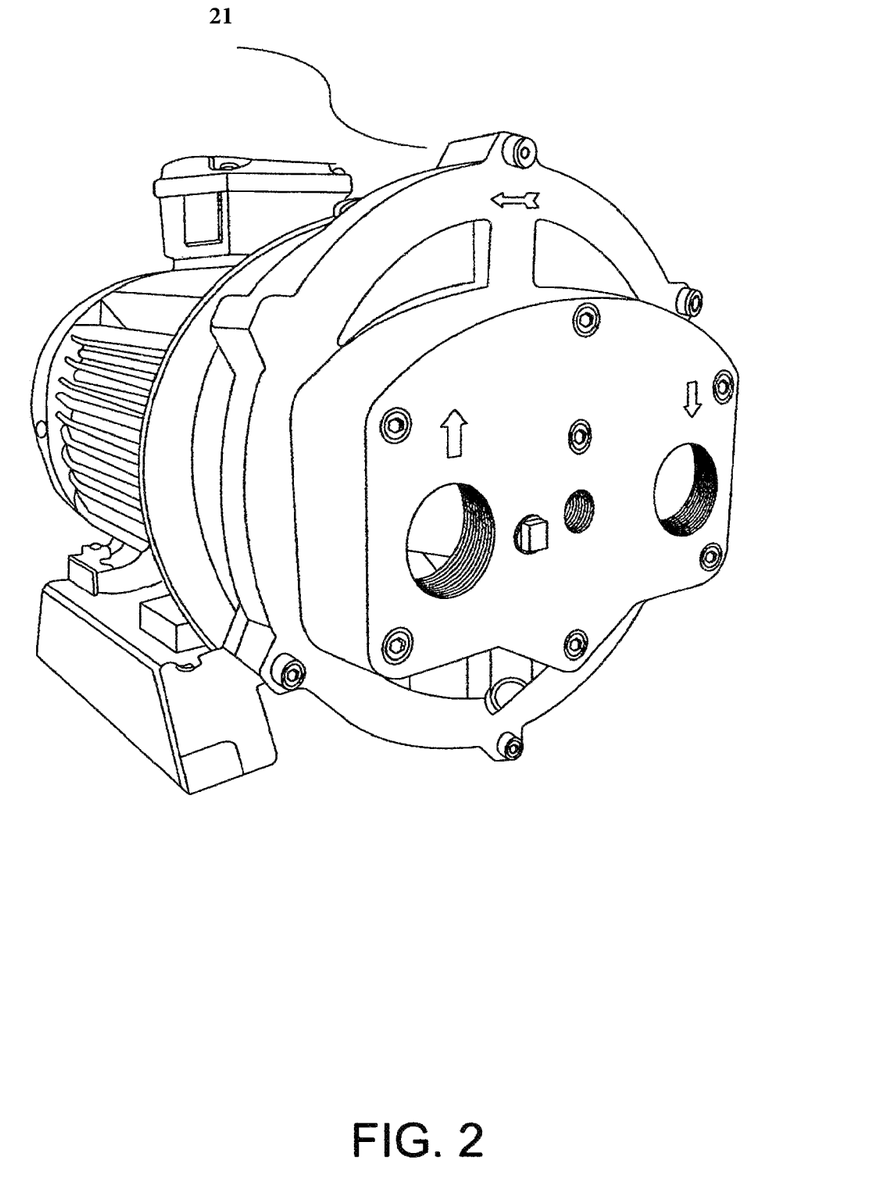
Figure 3:
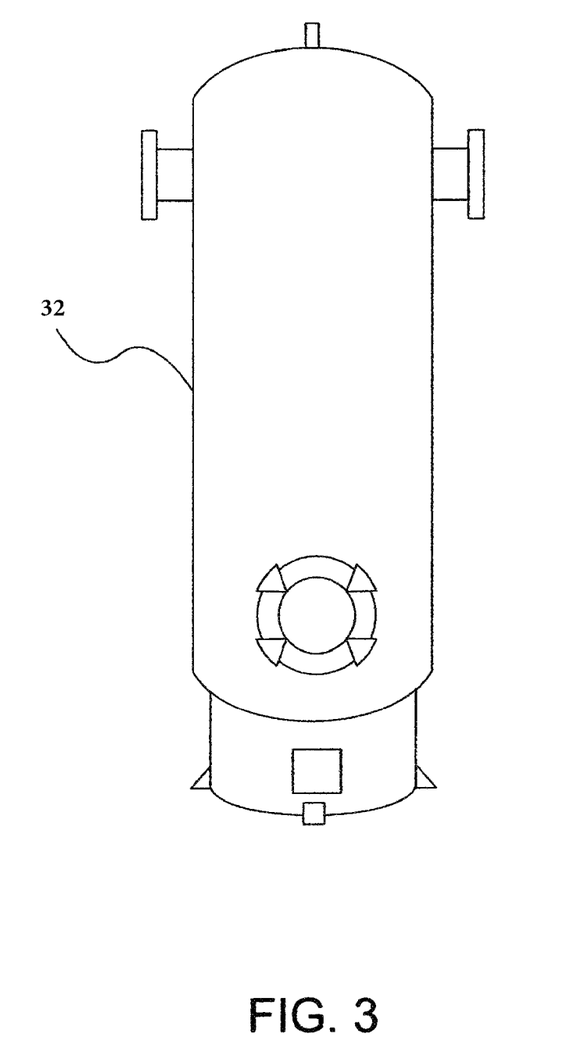
Figure 4:
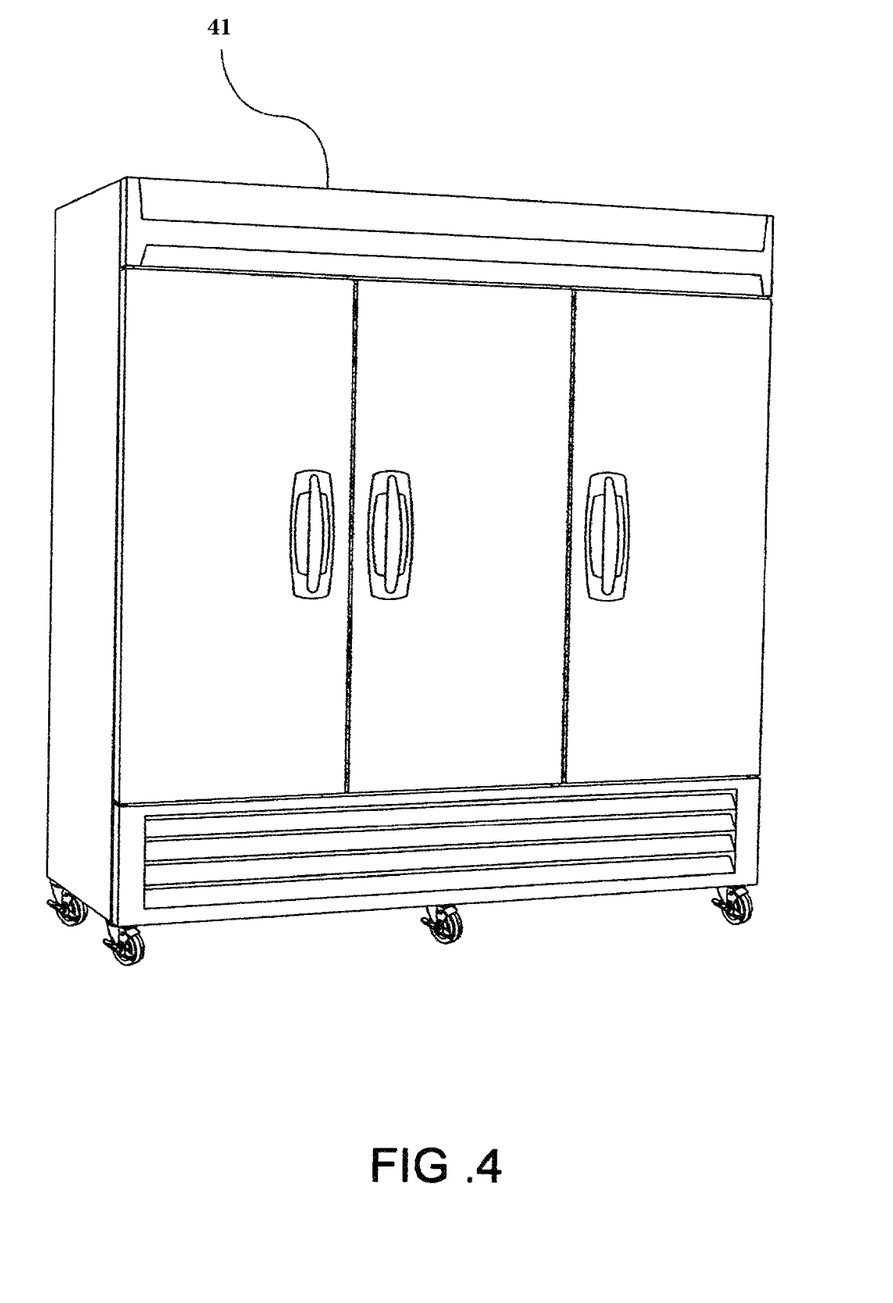
Figure 5:
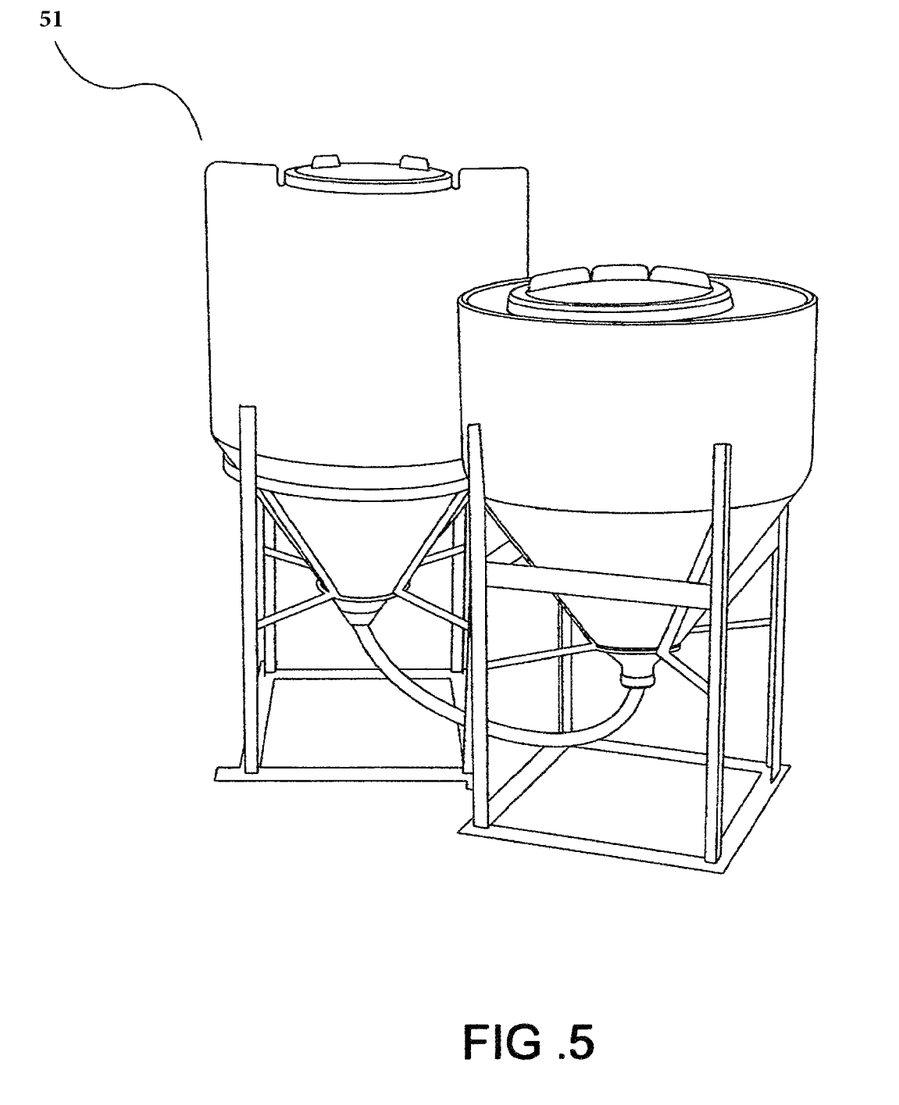

A collection of systems joined together and formed into a process which is composed of the following: (1) a big fan 1 as shown in FIG. 1 attached to an air vacuum pump 21 as shown in FIG. 2; (2) an air storage tank 32 as shown in FIG. 3; (3) a built in freezer 41 as shown in FIG. 4; (4) a liquid storage tank 51 as shown in FIG. 5; (5) peridotite rocks powder/transparent aqueous silica gel electrolysis chamber 72 as shown in FIG. 7; and (6) a power supply 75.

Figure 14:
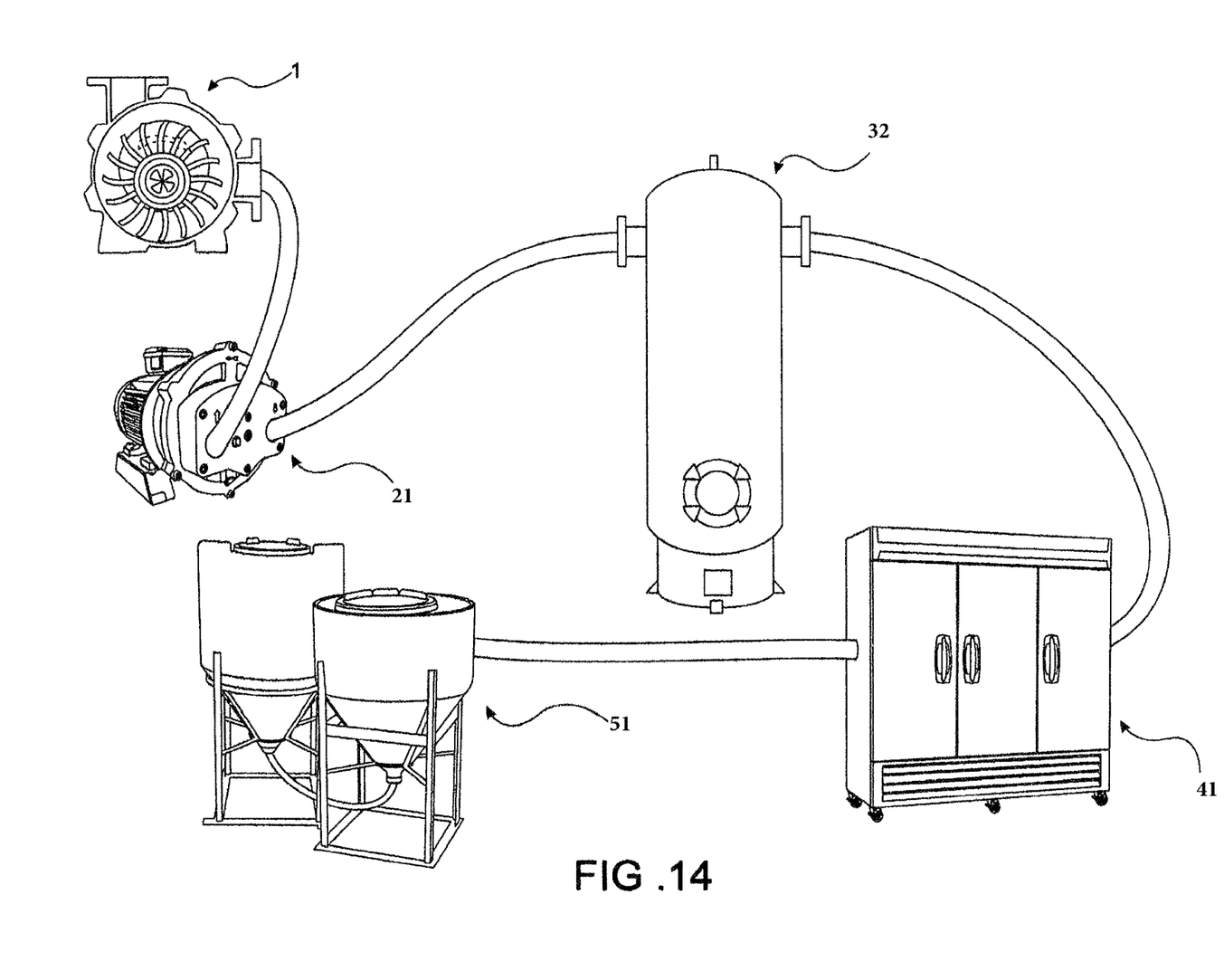

The big fan 1 as shown in FIG. 1 and FIG. 14 is attachable to an air vacuum pump 21 as shown in FIG. 2. A hose connects the big fan 1 to the air vacuum pump 21. The big fan 1 can be positioned in an elevated location while the air vacuum pump 21 is below it as shown in FIG. 14. The big fan 1 with attached air vacuum pump 21 conducts the suctioning of dry atmospheric air and captures the CO2. The suctioned air is stored in an air storage tank 32 as shown in FIG. 3. Air contains oxygen and nitrogen. Air contains pure gases in it. Pure gases can be separated from air. To allow the separation of pure gases in the air, it has to be frozen and then liquified again. Pure gases are transferred to a built-in freezer 41 as shown in FIG. 4 and then to the liquid storage tank 51. The built-in freezer 41 freezes the pure gases and then the pure gases are defrosted in order to liquify the pure gases. The liquified gas is drained and the liquid is transferred to a liquid storage tank 51 through a hose that connects the freezer 41 and the liquid storage tank 51.

Figure 7:
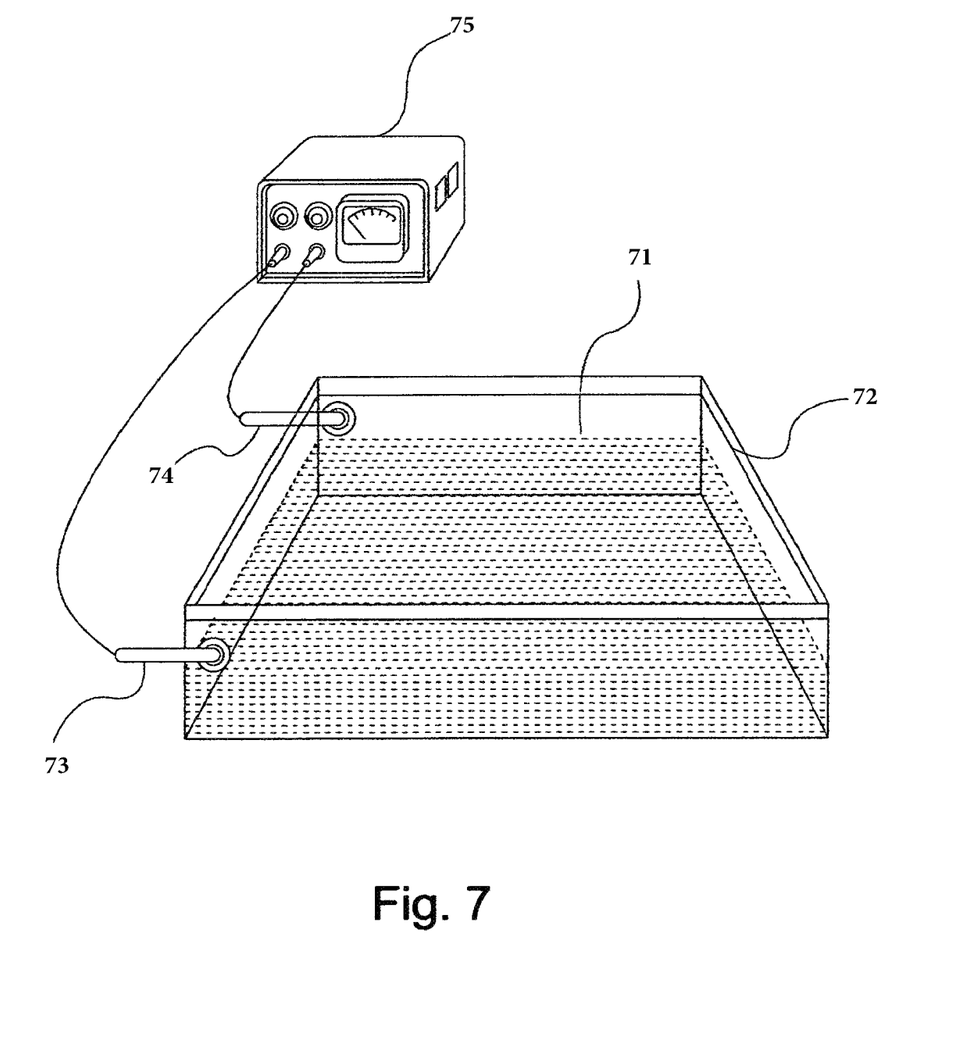
Figure 8:
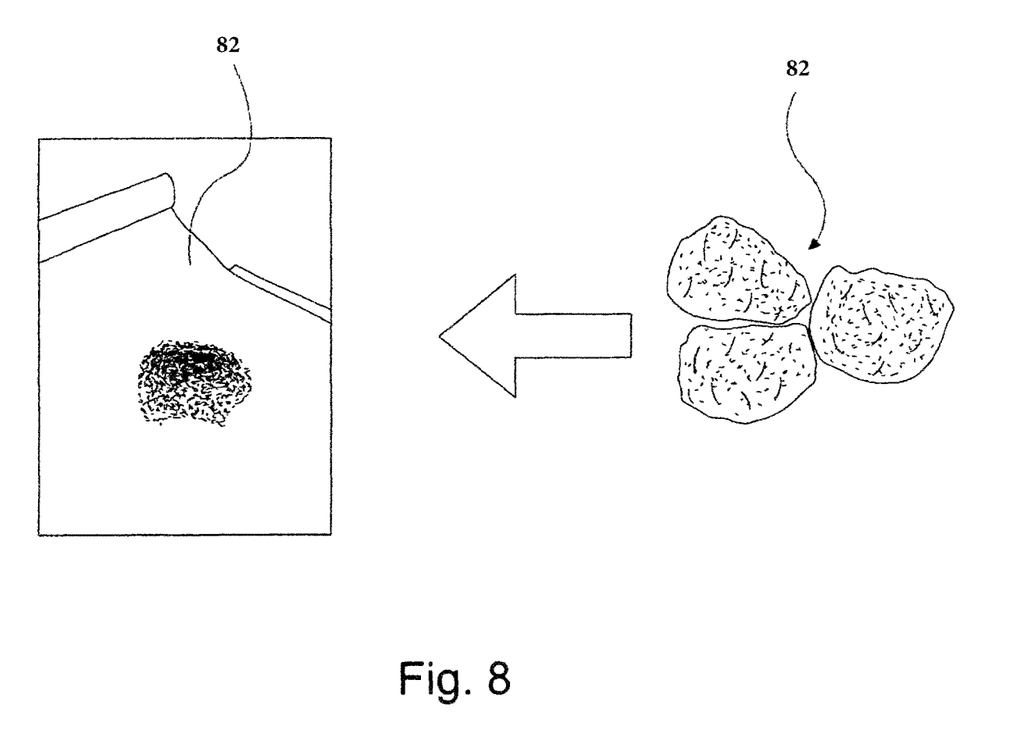
Figure 9:
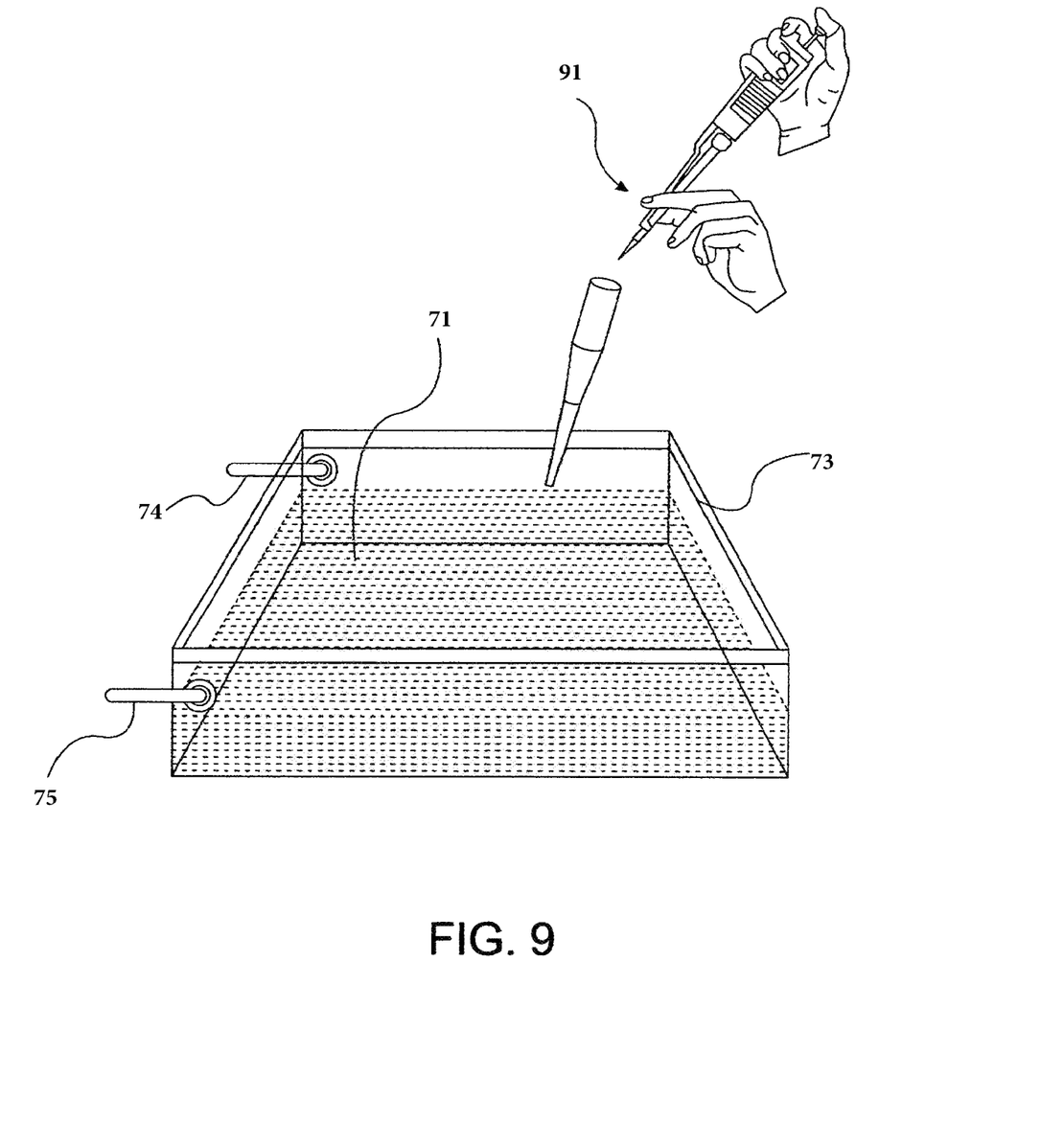

An electrolysis chamber 72 as shown in FIG. 7-FIG. 11 is made up of plexi-glass or polycarbonate rectangular in shape. The gel is prepared made up of an aqueous transparent silica gel mixed with peridotite rocks powder 71 as shown in FIG. 7, FIG. 8, and FIG. 9. Peridotite rocks (Ca-rick, Mg-bearing) 81 as shown in FIG. 8 are crushed and pulverized to form a powder 82 which can serve as an absolute molecular sieve for carbon sequestration. A tracking dye 91 as shown in FIG. 9 is added to the peridotite powder 71 to track the movements of the molecules. Dye molecules are positively charged molecules.

Figure 10:
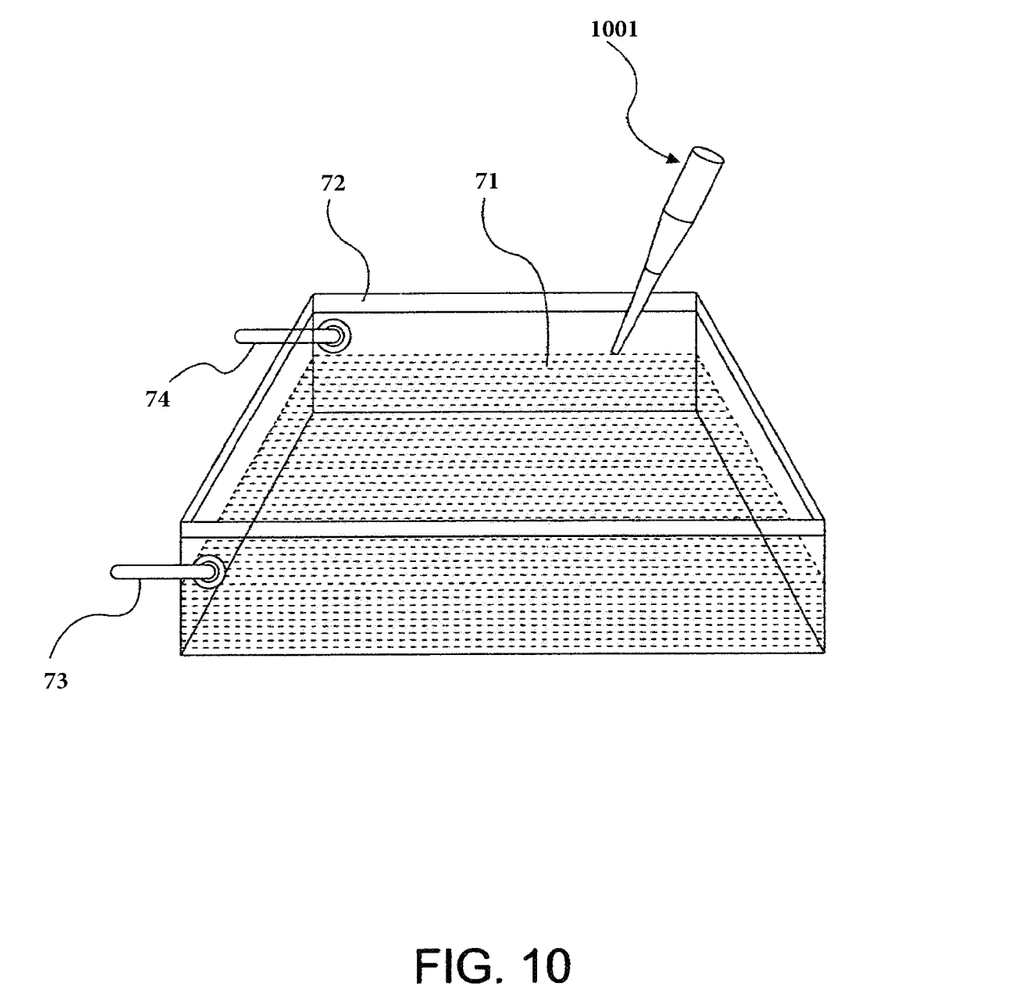
Figure 11:
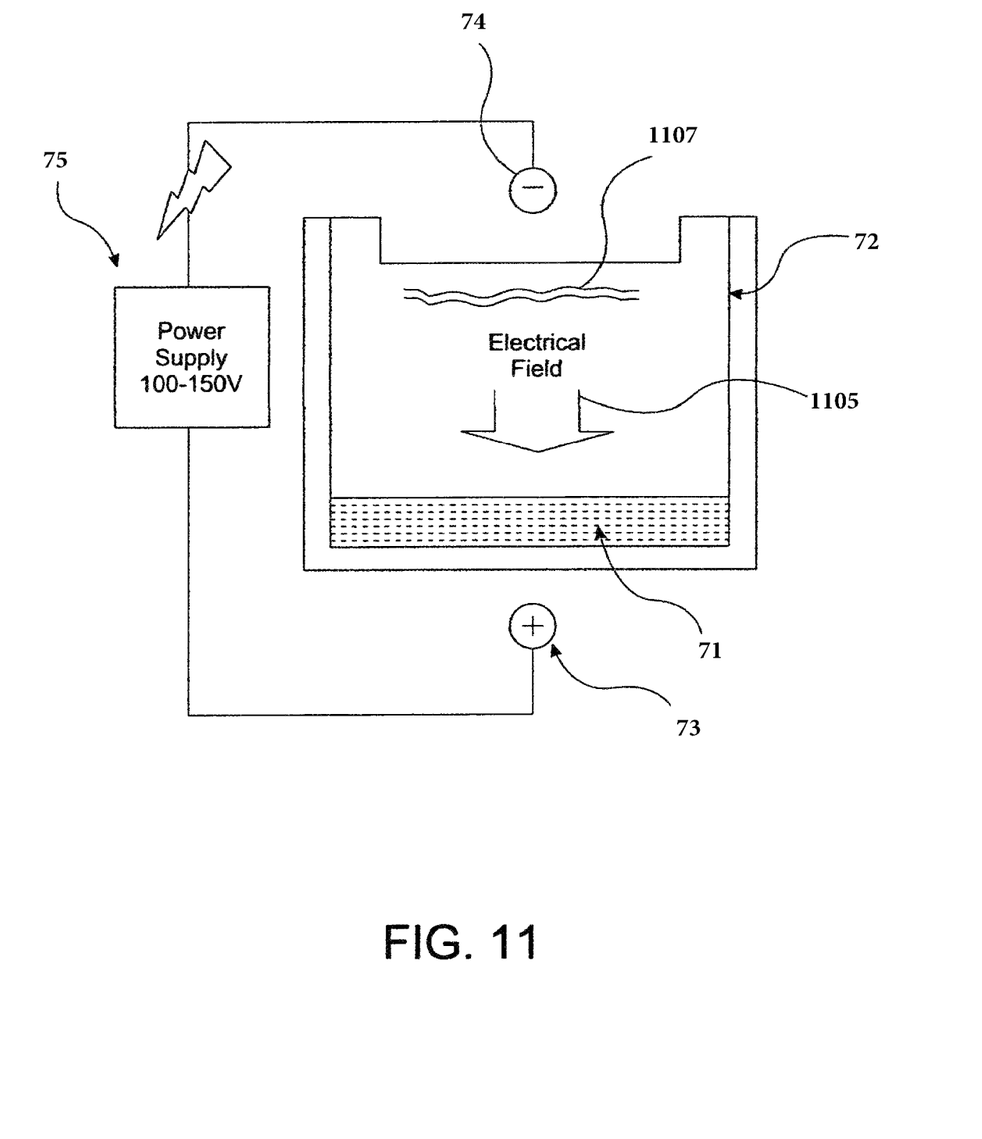

The gel electrolysis chamber 72 as shown in FIGS. 7-11 has an anode (+) 73 and cathode (−) 74 points to connect to a power supply 75 and chamber 72. Upon switching on of the power supply 75, migration of the molecules towards the anode and cathode takes place due to an electrical field 1105 as shown in FIG. 11 generated by the volts. The liquified gases are injected to the transparent aqueous silica gel 71 as shown in FIG. 10. Carbon dioxide (CO2) is dissolved in water (H2O) to form carbonic acid. Hydrogen (H) ions dissociate from carbonic acid to give bicarbonate. Due to the electrical field 1105 generated by volts, molecules began to migrate to the anode (+) 73 and cathode (−) 74 sides. As carbonate ions migrate to the anode 73 and react to the calcium cation. Peridotite rocks powder 71 have calcium cation. The carbonate ions react to peridotite rocks powder 71 to form calcium carbonate. Other molecules such as hydrogen (H) migrate to the cathode 74 that can be harvested from the processes and stored in the cathode tube storage for energy use.

DESCRIPTION OF DRAWINGS

FIG. 1

1. Big fan blades (suction the dry atmospheric air)

Figure 6:
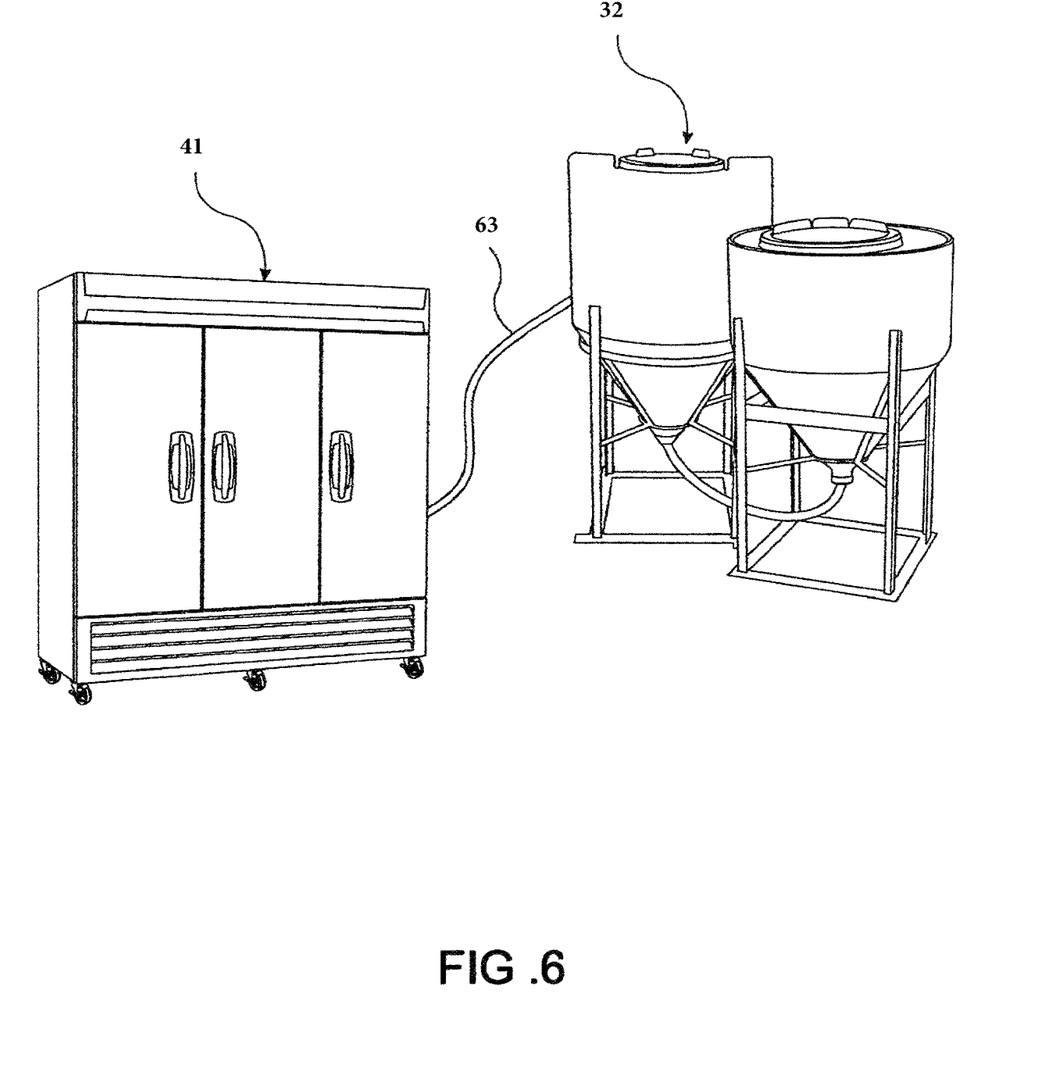
Figure 12:
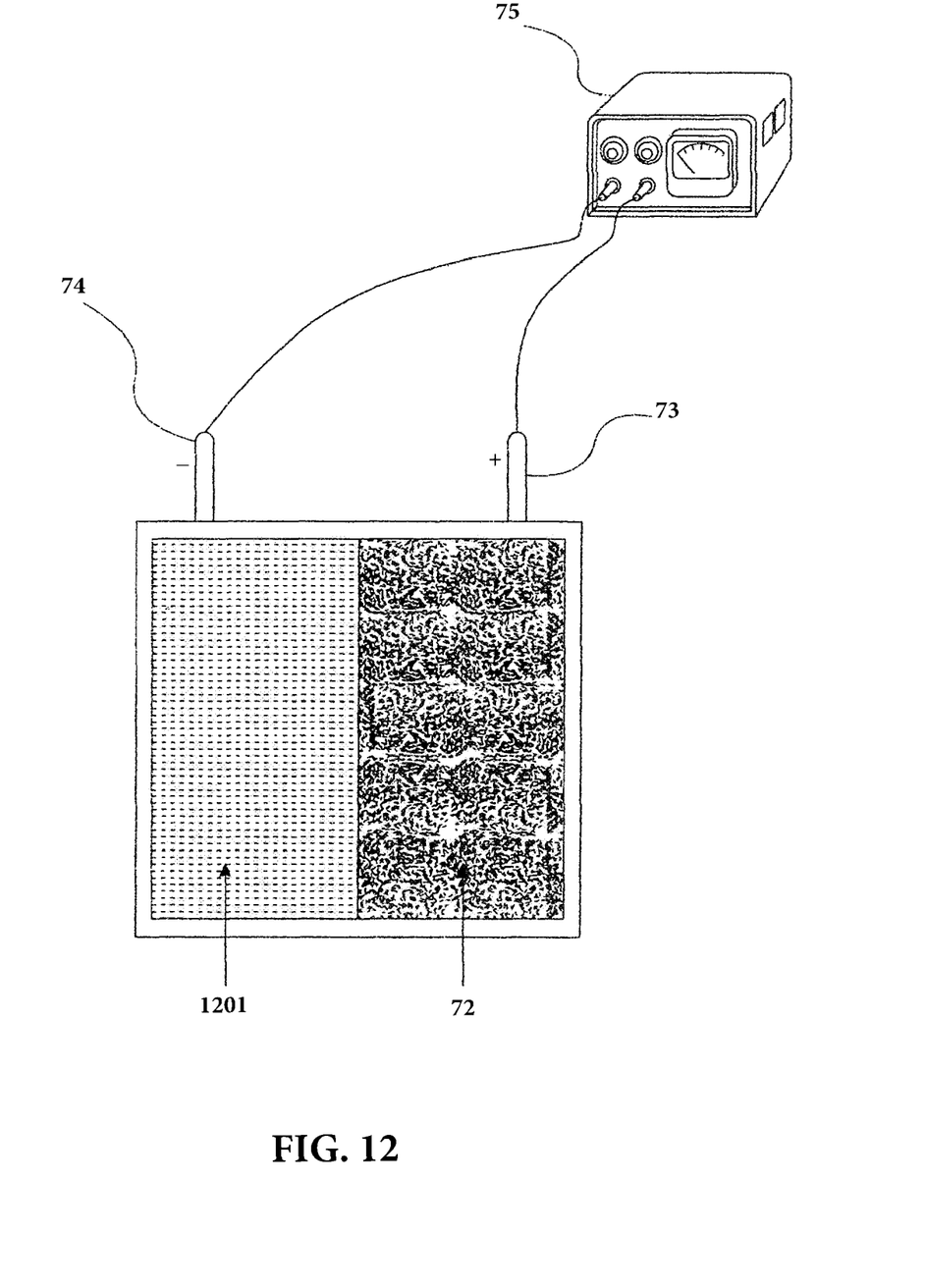
Figure 13:
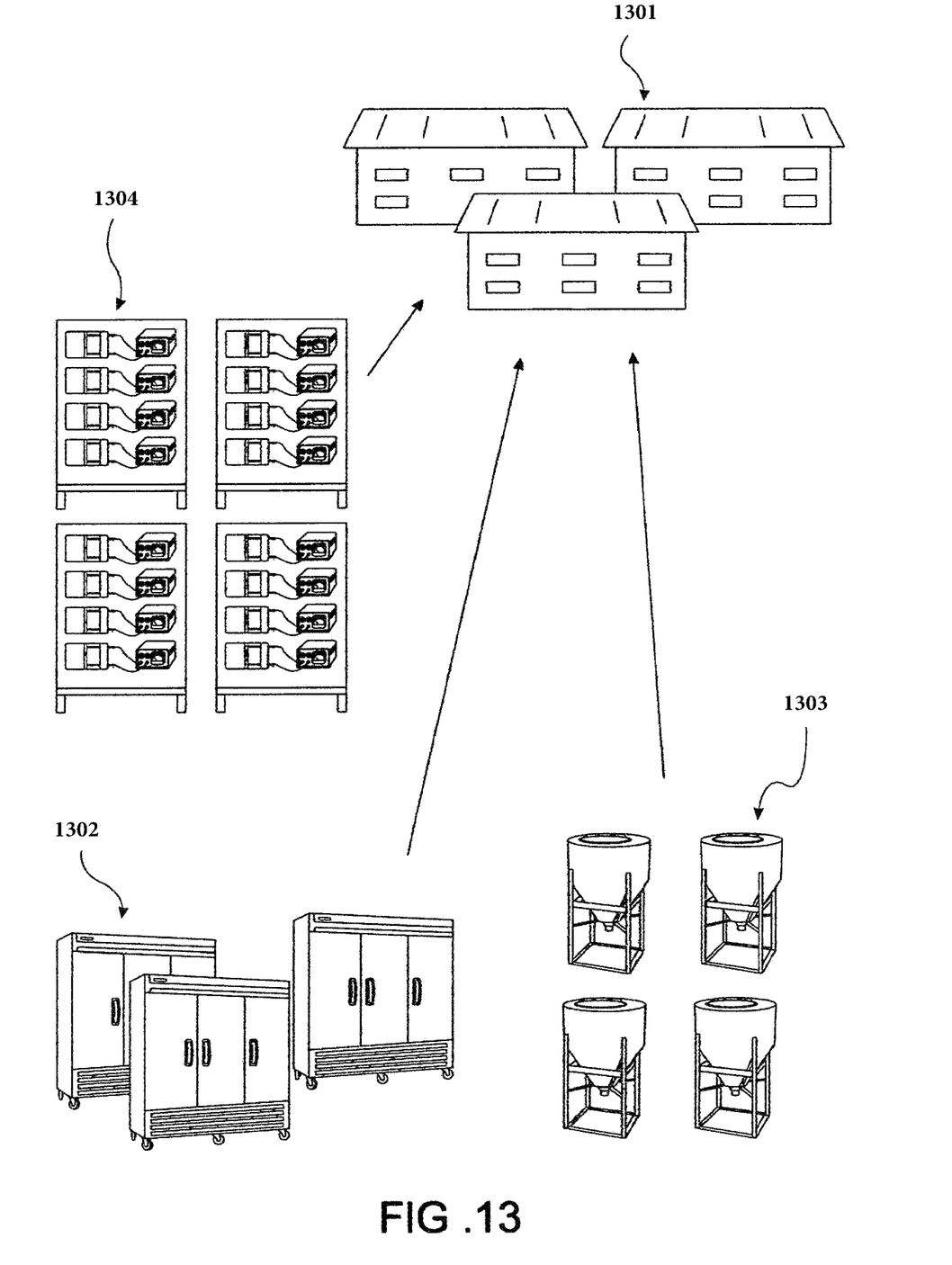

2. Inlet
3. Rotor
4. Gas undergoing compression
5. Pump body
FIG. 2
1. Air vacuum pump (pulls/vacuum the suctioned air from the big fan then pulls the air towards the air storage tank) 21
FIG. 3
1. Air storage tank (serves as a storage of air/gas) 32
FIG. 4
1. Built-in freezer (air/gas transferred to this freezer to freeze the air/gas then liquify by defrosting) 41
FIG. 5
1. Liquid storage tank (serves as a storage of the liquified gas) 51
FIG. 6
1. Built-in freezer 41
2. Liquified air/gas storage tank 32
3. Rubberized hose (transfers the liquid into the tank) 63
FIG. 7
1. Aqueous silica gel mixed with peridotite rocks powder 71
2. Aqueous silica and peridotite powder electrolysis chamber 72
3. Anode (+) 73
4. Cathode (−) 74
5. Power supply 75
FIG. 8
1. Pieces of peridotite rocks 81
2. Peridotite rocks powder/pulverized 82
FIG. 9
1. Tracking dye injection 91
2. Aqueous silica gel with peridotite powder 71
3. Electrolysis chamber 73
4. Anode (+), positive electrode 74
5. Cathode (−), negative electrode 75
FIG. 10
1. Injection tube for liquid loading 1001
2. Aqueous silica gel/peridotite powder electrolysis chamber 72
3. Transparent silica gel mixed with peridotite powder 71
4. Anode 74
5. Cathode 75
FIG. 11
1. Power supply 75
2. Cathode 74
3. Anode 73
4. Aqueous silica gel mixed with peridotite powder 71
5. Electrical field powered by volts or power supply 1105
6. Peridotite powder/silica gel electrolysis chamber 72
7. Liquid injected to aqueous silica gel with peridotite powder 1107
FIG. 12
1. Liquified gas molecules migrate to anode side 1201
2. Carbonate ions migrated to anode side and react to cation (+) of Calcium (Ca) in peridotite rocks powder to form calcium carbonate 1202
3. Cathode 74
4. Anode 73
5. Power supply 75
FIG. 13:
1. Plant production (where the processes takes place of converting the liquified gases into calcium carbonate) 1301
2. Pure gases frozen in the built-in freezer 1302
3. Liquified air/gases stored in the liquid storage tank 1303
4. Peridotite powder and silica gel electrolysis 1304
FIG. 14
1. Big fan blades (suction the air) 1
2. Air vacuum pump (vacuum the suction air towards the air storage tank) 21
3. Air storage tank (storage of air/gas) 32
4. Built-in freezer (freeze the air/gas to liquid) 41
5. Liquid storage tank (storage for liquified air/gas) 51

What is claimed is:

1. A method for capturing carbon dioxide ($CO_2$), comprising:
   suctioning dry atmospheric air using a fan, wherein the fan is attached to an air vacuum pump such that the air vacuum pump can pull the suctioned air;
   transferring the suctioned air to an air storage tank;
   transferring the suctioned air to a freezer in order to freeze the suctioned air;
   freezing the suctioned air;
   after freezing the suctioned air for a period of time, defrosting the frozen suctioned air to form a liquified gas;
   transferring the liquid gas to an electrolysis chamber having aqueous silica gel mixed with peridotite rocks formed into a powder, wherein the aqueous silica gel serves as a molecular sieve of carbon molecules,
   wherein the electrolysis chamber comprises at least one anode and at least one cathode and wherein the electrolysis chamber is coupled to a power supply;
   activating the power supply; and
   upon activating the power supply, beginning migration of electrically charged molecules through the aqueous silica gel mixed with peridotite rocks formed into the powder in order to form calcium carbonate in order to capture the $CO_2$.

2. The method of claim 1, further comprising, adding tracking dye to the aqueous silica gel in order to track movement of the molecules.

3. The method of claim 1, wherein purified gas is separated from the suctioned air after freezing and then defrosting the suctioned air.

4. The method of claim 1, wherein the fan is positioned in an elevated position.

5. The method of claim 4, wherein the air vacuum pump is connected to the fan and positioned below the fan.

6. The method of claim 1, wherein carbonate ions react with the powder to form the calcium carbonate.

* * * * *